(12) United States Patent
Ohkubo (10) Patent No.: US 6,941,831 B2
(45) Date of Patent: Sep. 13, 2005

(54) BALL SCREW APPARATUS (75) Inventor: Tsutomu Ohkubo, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/206,200

(22) Filed: Jul. 29, 2002

(65) Prior Publication Data
US 2003/0031527 A1 Feb. 13, 2003

(30) Foreign Application Priority Data
Jul. 30, 2001 (JP) .................................... P2001-230441
Jul. 16, 2002 (JP) .................................... P. 2002-206982

(51) Int. Cl.[7] .............................................. F16H 1/18
(52) U.S. Cl. .................. 74/424.87; 74/424.86
(58) Field of Search ........................ 74/424.82, 424.86, 74/424.87, 89.23, 89.34, 89.36

(56) References Cited

U.S. PATENT DOCUMENTS

| | | | | |
|---|---|---|---|---|
| 2,298,011 A | * | 10/1942 | Hoffar ...................... | 74/424.87 |
| 3,161,073 A | * | 12/1964 | Deutsch et al. .......... | 74/424.87 |
| 3,306,124 A | * | 2/1967 | Adams ...................... | 74/424.87 |
| 3,512,426 A | * | 5/1970 | Dabringhaus ............ | 74/424.87 |
| 3,580,098 A | * | 5/1971 | Goad ........................ | 74/424.87 |
| 3,667,311 A | * | 6/1972 | Wysong .................... | 74/424.75 |
| 4,074,585 A | * | 2/1978 | Richaud et al. .......... | 74/424.87 |
| 4,177,690 A | * | 12/1979 | Klinkenberg ............. | 74/424.86 |
| 5,014,568 A | * | 5/1991 | Schlenker ................. | 74/424.86 |
| 5,142,929 A | * | 9/1992 | Simpson, III ............ | 74/424.87 |
| 5,154,091 A | * | 10/1992 | Bianco ..................... | 74/424.86 |
| 5,555,770 A | * | 9/1996 | Dolata et al. ............ | 74/424.86 |
| 5,974,908 A | * | 11/1999 | Shirai et al. ............. | 74/424.87 |
| 5,988,007 A | * | 11/1999 | Nishimura ............... | 74/424.87 |

FOREIGN PATENT DOCUMENTS

| | | |
|---|---|---|
| DE | 44 43 924 A1 | 6/1995 |
| EP | 496 034 A1 | 7/1992 |
| EP | 930 450 A1 | 7/1999 |
| EP | 1 026 067 A2 | 8/2000 |
| FR | 2 191 677 | 2/1974 |
| GB | 892612 | 3/1962 |

* cited by examiner

Primary Examiner—David M. Fenstermacher
(74) Attorney, Agent, or Firm—Sughrue Mion, PLLC

(57) ABSTRACT

The ball screw apparatus of an end cap type comprises a ball nut which includes a nut main body having a ball circulation hole penetrating through the nut main body in the axial direction thereof and two end caps respectively fixed to the two end portions of the nut main body and defining two ball circulation R portions between the end faces of the nut main body and themselves. A guide groove for a ball is defined only on the end face side of the nut main body to thereby define the ball circulation R portion, and the shapes of the surfaces of the end cap, which are disposed opposed to the end faces of the nut main body, are defined substantially uniform over the entire peripheries thereof.

8 Claims, 7 Drawing Sheets

FIG.1

OUTSIDE DIAMETER OF GUIDE GROOVE ON NUT MAIN BODY SIDE

GROOVE BOTTOM ON THE NUT MAIN BODY SIDE

BALL CENTER LOCUS

FIG.2

BALL CENTER LOCUS

TUBE SYSTEM
FORCING UP PORTION

FIG.8B

END CAP SYSTEM
FORCING UP PORTION

FIG.8C

DEFLECTOR SYSTEM

FIG.9

OUTSIDE DIAMETER PORTION OF THE SCREW SHAFT
FLAKING
SCREW GROOVE

PRIOR ART

FIG.12B

PRIOR ART

FIG.13

PRIOR ART

FIG.14

PRIOR ART

BALL SCREW APPARATUS

BACKGROUND OF THE INVENTION

The present invention relates to a ball screw apparatus of an end cap type for use in a feed apparatus and, in particular, to a ball screw apparatus which is suitable for high speed feed.

Figure 10:
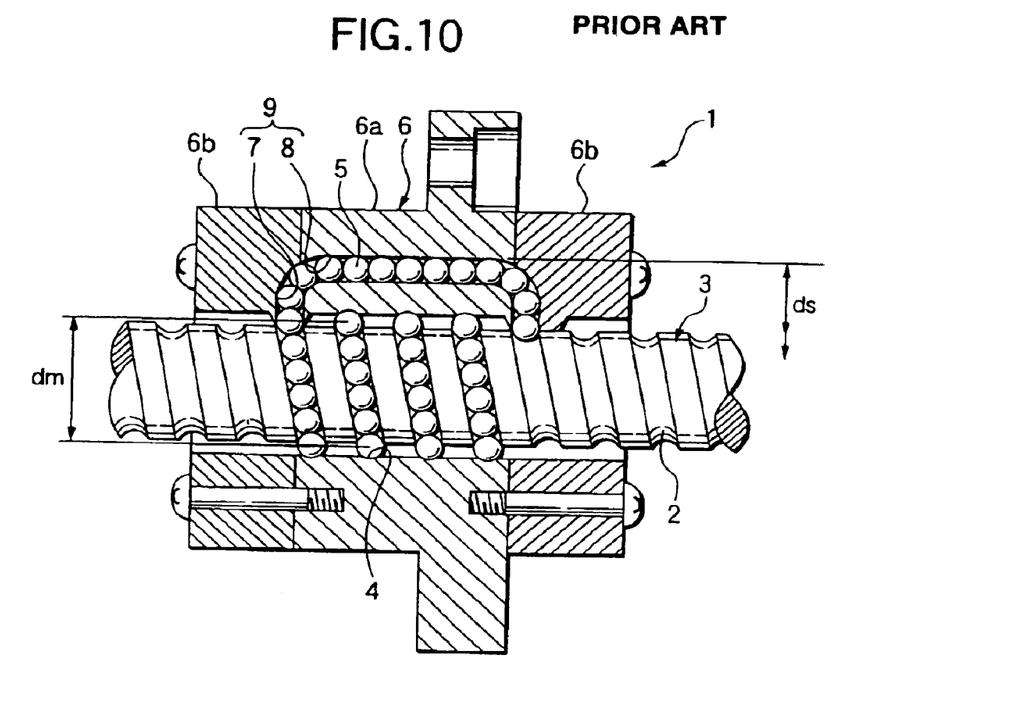
FIG. 10 is an explanatory section view of a conventional ball screw apparatus.

Conventionally, as a ball screw apparatus of this type, for example, there is known such a ball screw apparatus as shown in FIG. 10. This ball screw apparatus 1 comprises a screw shaft 3 and a ball nut 6 which is fitted with the screw shaft 3. The screw shaft 3 extends in the axial direction of the ball screw apparatus 1 and includes a screw groove 2; and, the screw groove 2 is defined in the outer peripheral surface of the screw shaft 3 and has a semicircular-shaped section. On the other hand, the ball nut 6 includes a screw groove 4 defined in the inner peripheral surface thereof and having a semicircular-shaped section. And, the ball nut 6 also includes a nut main body 6a to be fitted with the screw shaft 3, and an end cap 6b fixed to the axial-direction two end portions of the nut main body 6a through screws.

The screw groove 4 of the ball nut 6 and the screw groove 2 of the screw shaft 3 are disposed opposed to each other to thereby define a spiral-shaped passage between them; and, in the spiral-shaped passage, there are disposed a large number of steel-made balls 5 serving as rolling bodies in such a manner that they are allowed to roll along the spiral-shaped passage. And, due to the rotational movement of the screw shaft 3, the ball nut 6 is allowed to move linearly through the rolling movements of the balls 5.

By the way, when the ball nut 6 moves linearly, the balls 5 move while rolling along the spiral-shaped passage defined by the two screw grooves 2 and 4. However, in order to be able to move the ball nut 6 continuously, it is necessary to circulate the balls endlessly.

In view of this, not only, within the nut main body 6a, there is defined a ball circulation hole 8 which penetrates through the nut main body 6a in the axial direction thereof, but also, between the end face of the nut main body 6a and end cap 6b, there is defined a ball circulation R portion 7 which allows the ball circulation hole 8 and two screw grooves 2, 4 to communicate with each other; and, the ball circulation R portion 7 and ball circulation hole 8 cooperate together in defining a ball circulation passage 9 through which the balls 5 rollingly moving between the two screw grooves 2 and 4 are allowed to circulate endlessly.

Figure 11:
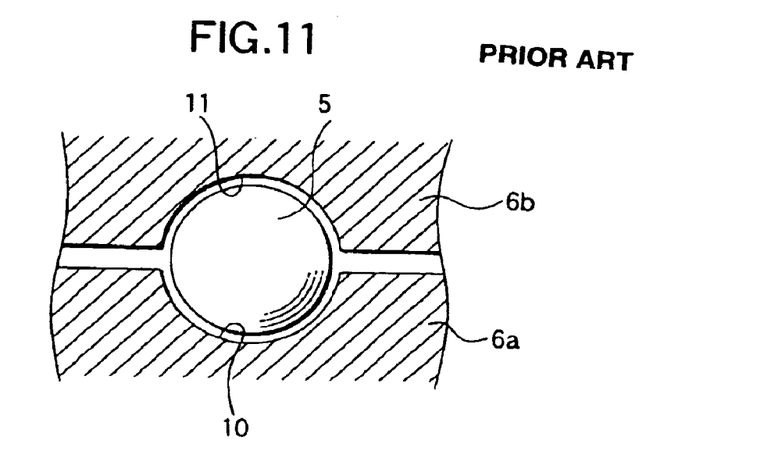
FIG. 11 is an explanatory section view of a conventional ball circulation R portion.
Figure 12A:
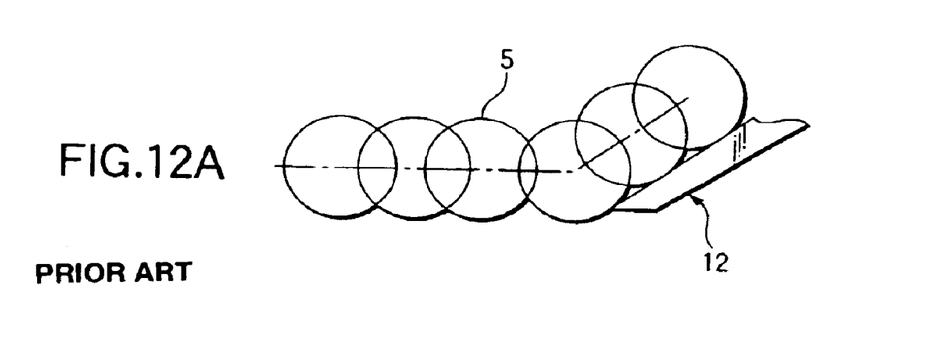
Figure 12B:
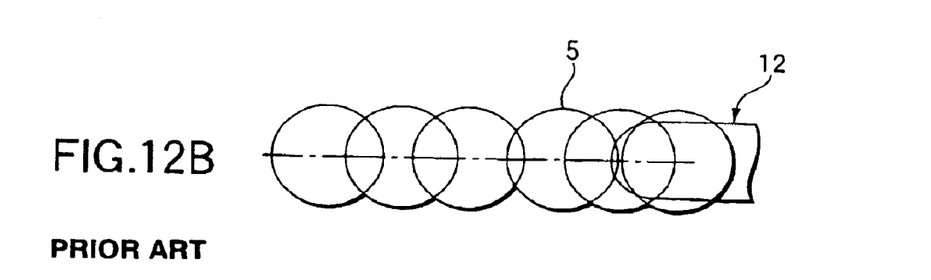

In the ball circulation R portion 7, as shown in FIG. 11, a guide groove 10 defined in the end face of the nut main body 6a and a guide groove 11 defined in the end cap 6b are disposed opposed to each other to thereby define a circulation passage for the balls 5. Also, as shown in FIG. 12, on the end cap 6b, there is disposed a tongue 12 in such a manner that it projects from the screw groove 2 of the screw shaft 3; and, this tongue 12 is used to scoop up the balls 5 rollingly moving between the two screw grooves 2 and 4 in a load area and then guide the balls 5 to the ball circulation R portion 7.

Figure 13:
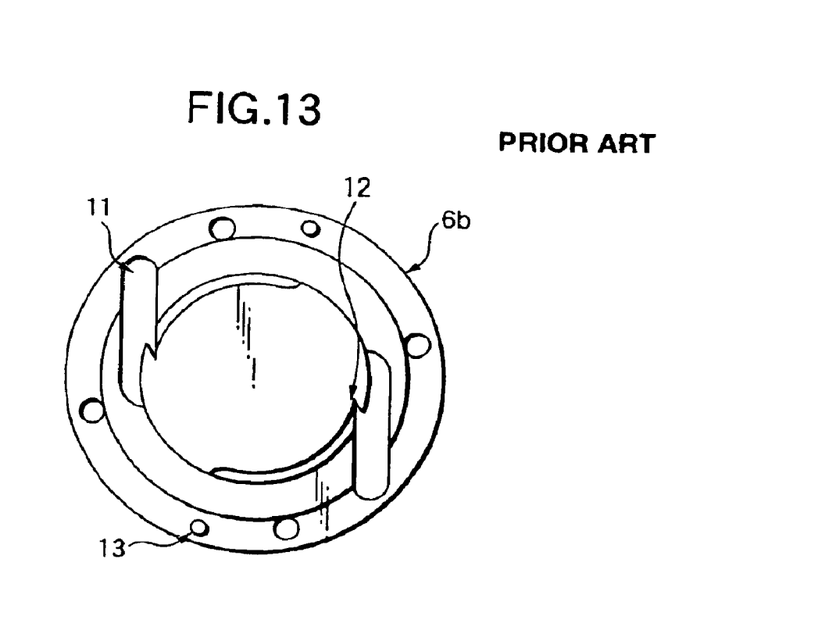
FIG. 13 is a view of a conventional end cap.
Figure 14:
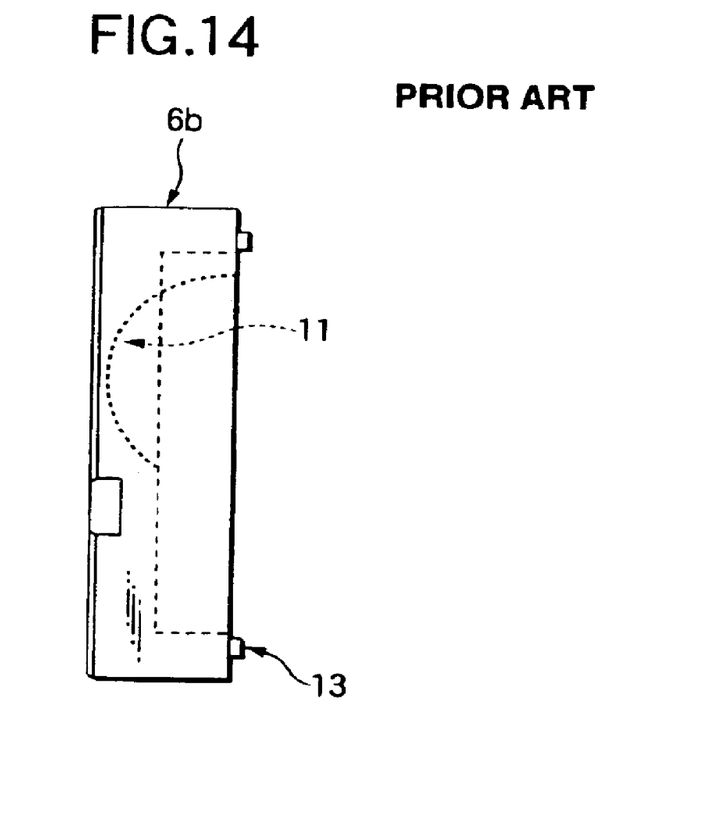
FIG. 14 is a left-side side view of FIG. 13.

Here, FIGS. 13 and 14 show the details of the conventional end cap 6b. As can be seen from FIGS. 13 and 14, in the end cap 6b, there is defined a concave-shaped guide groove 11 which defines a tongue 12 for scooping up the balls 5 and ball circulation R portion 7; that is, the end cap 6b has a three-dimensional complicated shape. Also, since it is difficult to work the tongue 12 and guide groove 11 at the same time, the tongue 12 and guide groove 11 are easy to differ in position from each other. Therefore, there is a possibility that this position difference can impede the smooth circulatory movements of the balls 5 to thereby degrade the operation of the ball screw apparatus and incur an increase in noises.

Also, in case where the end cap 6b is worked using a machine, the end cap 6b is high in cost due to the complicated shapes of the tongue 12 and guide groove 11. Therefore, generally, the end cap 6b is molded of not metal material but resin material. However, it is difficult to adapt the resin-molded end cap flexibly to various specifications of the shaft diameter and lead of the screw shaft 3 and the resin-molded end cap is poor in heat resistance, chemical resistance and strength against a slight collision.

Further, as described above, in the ball circulation R portion 7, the balls 5 rollingly moving between the two screw grooves 2 and 4 not only are scooped up in the load area but also are returned to the ball circulation hole 8, that is, the rollingly moving balls 5 are received and delivered on these two sides. However, as shown in FIG. 11, in the structure where the end faces of the end cap 6b and nut main body 6a respectively include the guide grooves 11 and 10 for the balls 5, in case where the working accuracy of the respective guide grooves 11 and 10 is not high, the guide grooves 11 and 10 cannot be matched to each other in position properly with no difference at the same time on the two ball reception and delivery sides. To avoid this, as shown in FIGS. 13 and 14, there are disposed, in the end faces of the end cap 6b and nut main body 6a, projections or recesses 13 for positioning the two guide grooves 11 and 10. However, in fact, whether the guide grooves 11 and 10 can be matched to each other in position properly with no difference at the same time on the two ball reception and delivery sides or not depends on the working accuracy of the guide grooves 11 and 10. Therefore, in case where this working accuracy is poor, the operation of the ball screw apparatus can be worsened and noises can be increased.

SUMMARY OF THE INVENTION

The present invention aims at eliminating the above-mentioned drawbacks found in the conventional ball screw apparatus. Accordingly, it is an object of the present invention to provide a ball screw apparatus not only capable of providing an end cap which is low in cost and simple in structure, can be flexibly adapted to various specifications of the shaft diameter and lead of a screw shaft, and is improved in heat resistance, chemical resistance and strength against a slight collision, but also can secure proper operation performance and can reduce noises.

In attaining the above object, according to a first aspect of the present invention, there is provided a ball screw apparatus comprising: a screw shaft including a spiral-shaped screw groove defined in an outer peripheral surface thereof; a ball nut loosely fittable with the screw shaft and including a screw groove defined in an inner peripheral surface thereof so as to correspond to the screw groove of the screw shaft, the ball nut comprising a nut main body forming a ball circulation hole penetrating through the nut main body in the axial direction thereof, and at least an end cap fixed to an end portion of the nut main body and forming a ball circulation R portion by collaborating with the end face of the nut main body, and the ball circulation R portion allowing the ball circulation hole and the screw groove to communicate with each other; and a large number of balls rollably interposed between both of the screw grooves, the ball circulation hole and the ball circulation R portion, wherein the nut main body defines a guide groove for the balls to thereby the ball circulation R portion is defined only on the end face sides thereof.

According to a second aspect of the present invention, a ball screw apparatus as set forth in the first aspect of the present invention, wherein the surface of the end cap opposed to the end face of the nut main body is defined substantially uniform in shape over the entire peripheries thereof.

According to a third aspect of the present invention, a ball screw apparatus as set forth in the first or second aspect of the present invention, wherein the end cap defines a hole through which the screw shaft is inserted, and the inside diameter of the hole is set smaller than a center circle diameter of the balls and larger than the outside diameter of the screw shaft.

According to a fourth aspect of the present invention, a ball screw apparatus as set forth in one of the first to third aspects of the present invention, wherein the depth of the guide groove defined in the end face of the nut main body is set 40% or more of the diameter of the ball.

According to a fifth aspect of the present invention, a ball screw apparatus as set forth in one of the first to fourth aspect of the present invention, wherein the screw groove of the screw shaft is defined arch-shaped, and both of a face of the screw groove and an outer face of the outer diameter of the screw shaft are connected via R-chamfering part, such that both faces contact in a right angled and cross sectional shape of the screw groove.

According to a sixth aspect of the present invention, a ball screw apparatus as set forth in the fifth aspect of the present invention, wherein an angle is set of 5 to 45° which is defined between the direction following the screw groove of the screw shaft and the direction where the ball is forced up from the screw groove toward the outer diameter-side of the screw shaft.

According to a seventh aspect of the present invention, a ball screw apparatus as set forth in the sixth aspect of the present invention, wherein a radius of curvature of the R-chamfered part is set of 15 to 45% of the radius of the ball.

BRIEF DESCRIPTION OF THE DRAWINGS

FIG. 4 is an explanatory view to show how the ball is scooped up on a ball circulation R portion side; specifically.

FIGS. 12A and 12B are an explanatory view of a conventional ball nut, showing how the ball is scooped up on the ball circulation R portion side through a tongue; specifically, FIG. 12A is a view when the ball nut including the ball circulation R portion is viewed from the lateral side thereof, and FIG. 12B is a view when the ball nut including the ball circulation R portion is viewed from above;

DETAILED DESCRIPTION OF THE PREFERRED EMBODIMENTS

Now, description will be given below of an embodiment of a ball screw apparatus according to the present invention with reference to the accompanying drawings.

Figure 1:
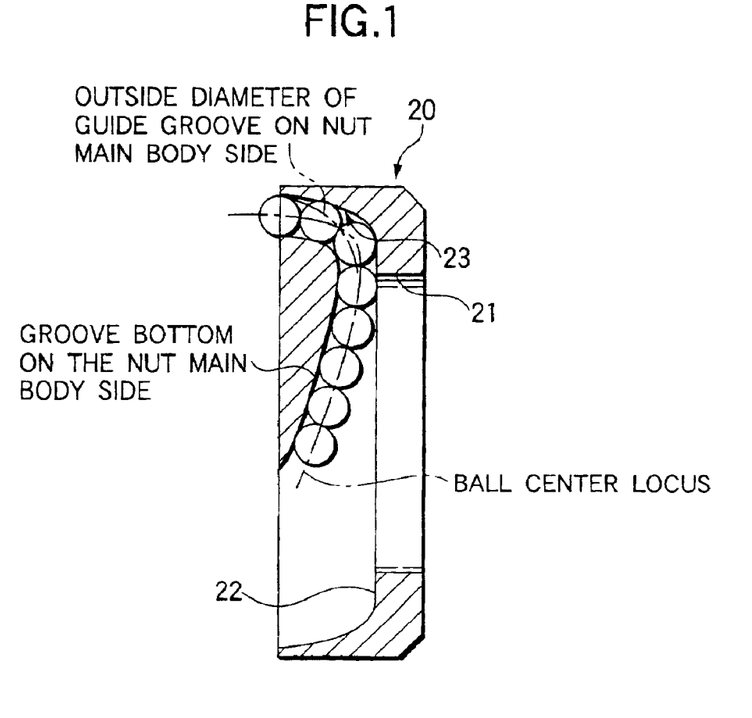
FIG. 1 is a schematic section view of an end cap included in a ball nut used in a ball screw apparatus according to an embodiment of the present invention.
Figure 2:
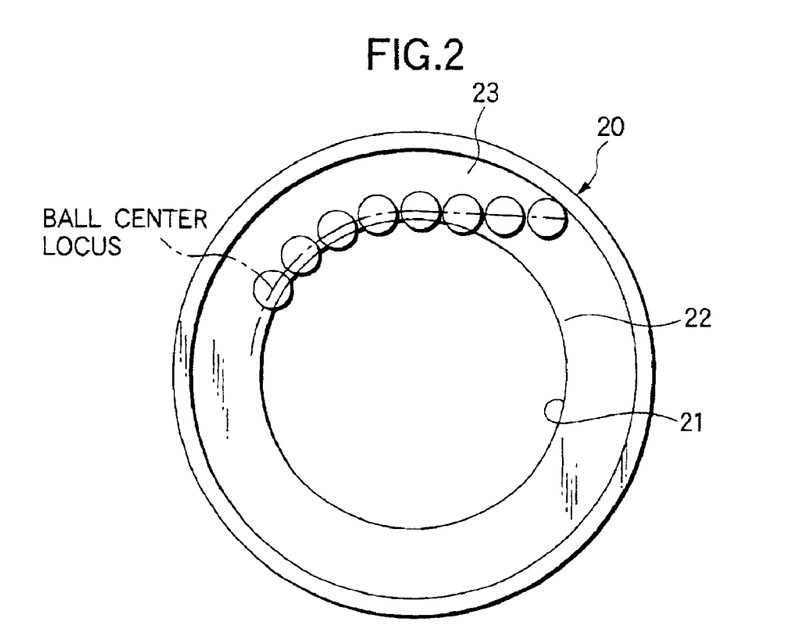
FIG. 2 is a left-side side view of FIG. 1.
Figure 3:
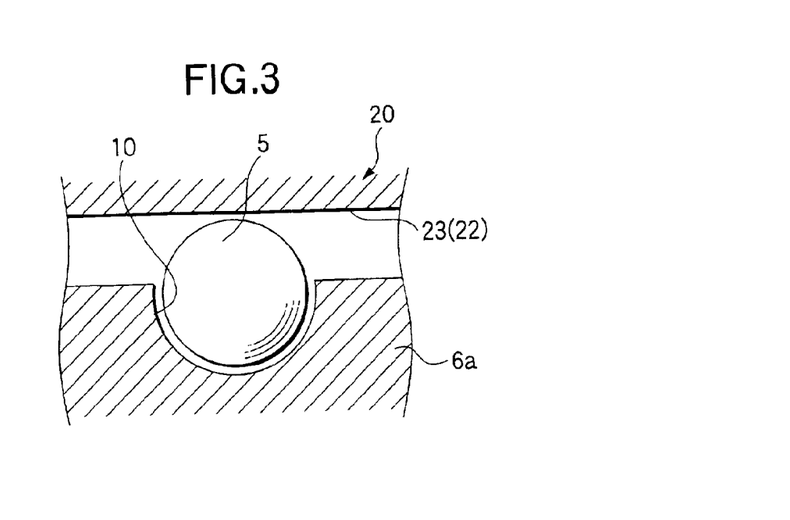
FIG. 3 is a section view of the ball nut including the end cap, explaining how a ball is held in a circulation passage.
Figure 4A:
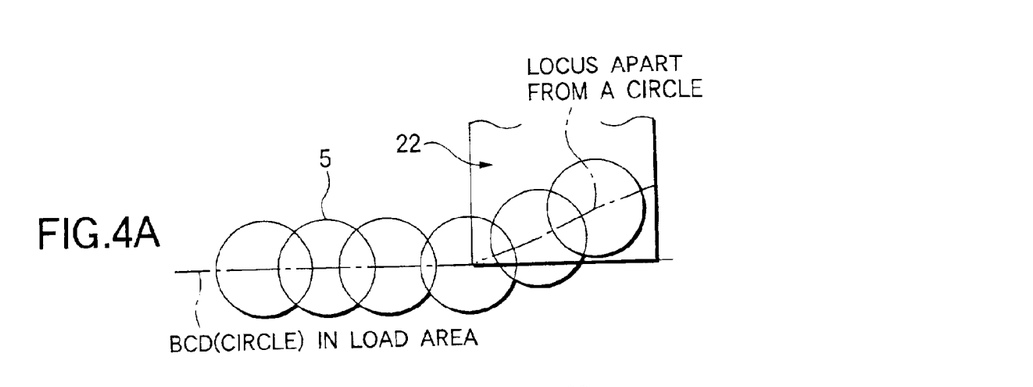
FIG. 4A is a view of part of the ball nut when the ball nut is viewed from the axial direction thereof.
Figure 4B:
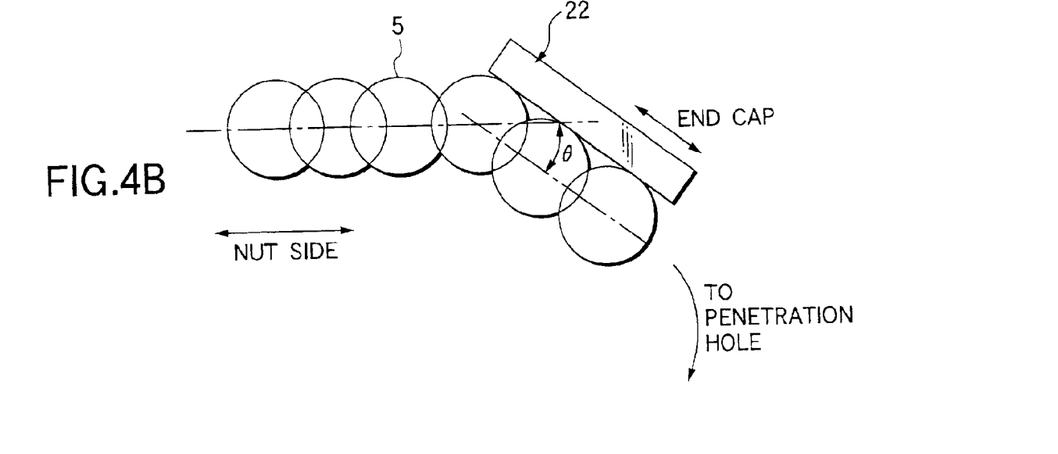
FIG. 4B is a view when the axis of FIG. 4A is viewed from the transverse direction with the lead angle of a screw shaft inclined.

FIG. 1 is a schematic section view of an end cap included in a ball nut used in a ball screw apparatus according to an embodiment of the present invention, FIG. 2 is a left-side side view of FIG. 1, FIG. 3 is a section view of the ball nut including the end cap, explaining how a ball is held in a circulation passage, and FIG. 4 is an explanatory view to show how the ball is scooped up on a ball circulation R portion side; specifically, FIG. 4A is a view of part of the ball nut when the ball nut is viewed from the axial direction thereof, and FIG. 4B is a view when the axis of FIG. 4A is viewed from the transverse direction with the lead angle of a screw shaft inclined. By the way, the basic structure of a ball screw apparatus according to the present embodiment, except for its end cap, is substantially identical with that of the above-mentioned conventional ball screw apparatus (FIG. 10). Therefore, description will be given hereinbelow only of the end cap and thus the remaining portions of the present embodiment will be described using the same designations shown in FIG. 10.

Referring now to FIGS. 1 to 3, this end cap 20, similarly to the conventional end cap, is fixed to the end face of the nut main body 6a through screws, is formed substantially in a short bottomed cylindrical shape, and includes an insertion hole 21 which is defined in the central portion of the bottom portion thereof and into which the screw shaft 3 can be inserted. The periphery of the insertion hole 21 is defined in a flat surface 22. And, on the inner surface side of the end cap 20 (the side of the surface that is opposed to the nut main body 6a), the portion of the end cap 20, which exists between the flat surface 22 and the open end side (left end side) of the end cap 20, is defined as a bowl-shaped curved surface portion 23.

Therefore, in the present embodiment, in the inner surface of the end cap 20, there is not defined a guide groove or a tongue for the balls 5. Due to this, on the side of end cap 20 that is opposed to the end face of the nut main body 6a, the surface shape thereof is uniform over the entire periphery thereof. By the way, in FIGS. 1 and 2, there is omitted the illustration of a mounting hole for mounting the nut main body 6a and a seal portion.

The curved surface portion 23 consists of a curved surface which can be obtained by connecting together the outer-most sides of the ball passing through the ball circulation R portion 7, while the inside diameter of the end cap 20 on the open end side thereof coincides with the outer-most outside diameter ds (see FIG. 10) of the ball circulation hole 8 of the nut main body 6a.

And, the ball 5, which has been introduced from between the two screw grooves 2 and 4 into the ball circulation R portion 7, as shown in FIG. 3, is restricted between a guide groove 10 defined in the end face of the nut main body 6a and the inner surfaces (plane surfaces) of the end cap 20: that is, while the ball 5 is being restricted in this manner, the ball 5 is allowed to pass through the ball circulation R portion and is then returned to the ball circulation hole 8. The depth of the guide groove 10 to be defined in the nut main body 6a may be 0.4 or more times the diameter of the ball 5; however, in the neighboring portion of the ball circulation hole 8, preferably, the depth may be slightly greater. Practically, the depth of the guide groove 10 may be in the range of 0.4 to 1.2 times of the diameter of the ball 5.

By the way, the ball circulation R portion 7 and ball circulation hole 8, of course, are deigned so as to have a certain clearance with respect to the diameter of the ball 5 and, normally, the clearance maybe equal to or less than 1.25 times the diameter of the ball 5.

Also, the inside diameter of the insertion hole 21 of the end cap 20 is set smaller than the diameter dm of the center circle of the ball (see FIG. 10) and larger than the outside diameter of the screw shaft 3, while the flat surface 22 of the end cap 20 is disposed so as to extend along a direction intersecting at right angles to the axis of the screw shaft 3.

Figure 8A:
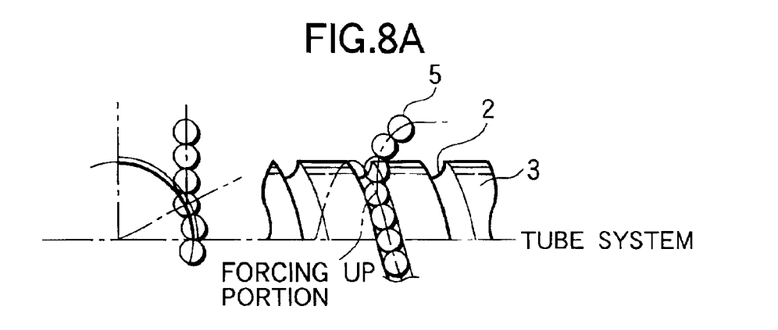
FIGS. 8A to 8C are views for explaining actions of the balls in the vicinity of the ball raking parts in the respective circulating systems, and 8A is the tube system, 8B is the end cap system, and 8C is the deflector system.
Figure 8B:
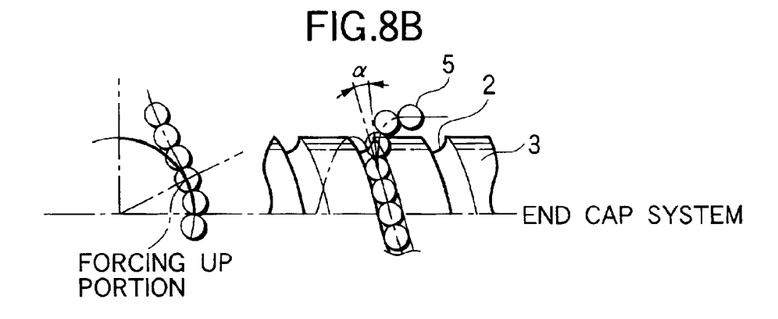

Only, the flat face 22 may be, depending on the lead angle, parallel to a rake angle (a face tilted at α° with respect to the lead angle shown in FIG. 8B).

Therefore, in the case of the ball 5 which rollingly moves between the two screw grooves 2 and 4, as shown in FIG. 4, the leading end portion of the ball 5 in the advancing direction thereof is contacted with the flat surface 22 (in FIG. 4, this is illustrated simply as a plate member) at the lead angle θ of the screw shaft 3 with respect to the flat surface 22, after then, the ball 5 is moved up on the flat surface 22 outwardly in the diameter direction thereof and is once scooped up to the outside diameter portion of the screw shaft 3, and then, as described above, is moved through the ball circulation R portion 7 to be returned to the ball circulation hole 8.

By the way, the angle between the flat surface 22 and the advancing direction of the ball 5 need not be always set equal to the lead angle θ of the screw shaft 3 and, in case where the angle is not set for the lead angle θ, the flat surface has a certain angle with respect to the right-angle surface of the screw shaft 3. Also, in case where the inside diameter of the insertion hole 21 cannot be set smaller than the ball center circle diameter dm, similarly to the conventional structure, a tongue may be disposed so as to project into the screw groove 2 and the ball 5 may be scooped up from the outside diameter portion of the screw shaft 3. Further, in case where the end cap 20 is required to be strong, the end cap 20 may be heat treated to thereby improve its hardness, or, the screw shaft 3 may consist of a screw shaft which is formed by rolling.

In the above-mentioned embodiment, since there is provided the end cap 20 having a structure in which the tongue 12 and guide groove 11 are not disposed, there is eliminated the need for consideration of the position difference between the tongue 12 and guide groove 11 which occurs in the conventional structure. This makes it possible to secure the smooth circulatory motion of the ball 5 within the ball circulation R portion 7, thereby being able to enhance the operation performance of the ball screw apparatus as well as reduce noises.

Also, in the present structure, because, on the side of end cap 20 that is opposed to the end face of the nut main body 6a, the surface shape thereof is uniform over the entire periphery thereof and also because the tongue 12 and guide groove 11 are omitted, when fixing the end cap 20 to the end face of the nut main body 6a, there can be eliminated the need for consideration of the phase of the end cap 20 in the peripheral direction thereof, that is, there can be eliminated the need to match the position of the end cap 20 to the guide groove 10 defined in the nut main body 6a. This not only can facilitate the mounting operation of the end cap 20 onto the end face of the nut main body 6a but also makes it hard for a level difference to occur within the ball circulation passage 9, which can control noises caused by the passage of the balls to thereby reduce the noises. Also, since the ball 5 is damaged less when it passes through the level-difference portion, the life of the ball 5 can be prolonged.

Further, because the structure of the end cap 20 can be simplified, even in the case of machine-worked products and molded products using metal material, the manufacturing costs of them can be reduced. And, since the freedom of selection of material is enhanced, not only the end cap 20 can be flexibly adapted to various specifications of the shaft diameter and lead of the screw shaft 3 but also the end cap 20 can be enhanced in heat resistance, chemical resistance and strength against a light collision.

Moreover, since, in the end cap 20, there is omitted the tongue 12 which projects into the screw groove 2 of the screw shaft 3 in the conventional structure, even in case where the screw groove 2 is defined in the screw shaft 3 by cutting, assembly of the screw shaft 3 is possible, so that the end face of the outside diameter portion of the screw shaft 3 can be formed wide. As a result of this, it is possible to use an oil seal for circulation of liquid for hollow cooling and a dust-proof seal, that is, such oil seal and dust-proof seal can be applied to the outside diameter surface of the screw shaft 3. At the same time, as the area on which the shoulder of a support bearing used in a ball screw shaft apparatus designed for a machine tool can be placed (the area of the end face of the outside diameter portion the screw shaft 3), there can be obtained a wide area, the present structure is able to cope with an increase in the size of a bearing.

In addition, in the conventional ball screw apparatus of an end cap type, since the lead angle of the screw shaft 3 is relatively large, when scooping up the ball 5 through the tongue 12, variations in the angle of the ball 5, which occur just after the time of scoop-up of the ball 5 up to the time of entry of the ball 5 into the ball circulation hole 8 through the ball circulation R portion 7, are large; in other words, the ball 5 is caused to pass while it is being curved with a small three-dimensional R.

This gives rise to a loss of the motion of the ball 5 and such loss of the ball motion results in the deteriorated operation performance of the ball screw apparatus. On the other hand, according to the present embodiment, after the ball 5 is contacted with the flat surface 22, the ball 5 is moved up on the flat surface 22 outwardly in the diameter direction thereof and is once scooped up to the outside diameter portion of the screw shaft 3, and the ball 5 is then introduced through the ball circulation R portion 7 to the ball circulation hole 8. Thanks to this, when compared with the conventional structure in which the ball 5 is scooped up through the tongue 12, the ball circulation R portion 7 can be made to have a large R, which not only can enhance the operation performance of the ball screw apparatus but also can contribute to a reduction in noises.

By the way, the ball screw apparatus of the present invention is not limited to the above embodiments, and modifications are appropriately available within a scope not getting out of the subject matter of the present invention.

Figure 6:
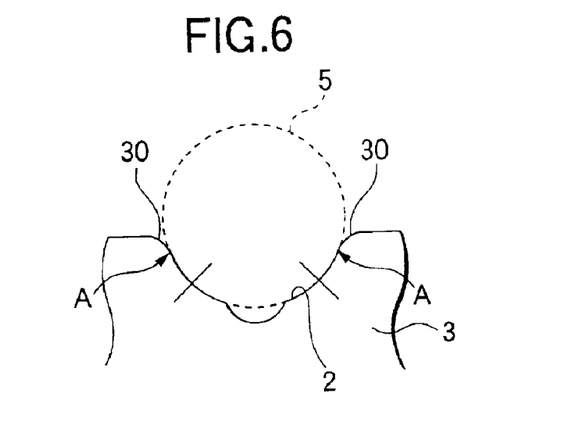
FIG. 6 is a view showing the right angled and cross sectional shape of the screw groove in the ball screw apparatus as the other embodiment of the present invention.

For example, ordinarily, in the right angled and cross sectional shape of the screw groove of the screw shaft in the end cap type ball screw apparatus, a chamfer is C-chamfered between the face of the screw groove and the face of the outer diameter of the screw shaft, but as shown in FIG. 6, the screw groove 2 of the screw shaft 3 is made Gothic arched, and in the right angled and cross sectional shape of the screw groove 2, the distance between the face of the screw groove 2 and the face of the outer diameter of the screw shaft 3 is connected via the R-chamfer 30 such that both faces contact, thereby enabling to heighten endurance (loading resistance) when driving the ball apparatus at high speed.

Figure 5:
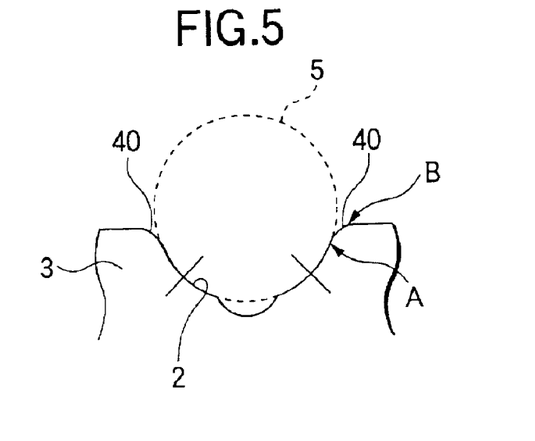
FIG. 5 is a view showing the right angled and cross sectional shape of the screw groove of the screw shaft in the tube circulating type ball screw apparatus.

To state this in detail, in the tube circulating type ball screw apparatus, for coping with the high speed, as shown in FIG. 5, the distance between the face of the screw groove and the face of the outer diameter of the screw shaft is connected via an R-chamfering 40 in the aright angled and cross sectional shape, and the R-dimension of the R-chamfering 40 is made as large as possible, and only the side of the screw groove is connected with a tangent line, thereby to avoid concentration of stress when the ball collides against the screw groove from a loading range.

In a deflector type ball screw apparatus where the ball gets over the outer diameter of the screw shaft similarly to the end cap type ball screw apparatus of the present invention, the distance is R-chamfered between the face of the screw groove and the face of the outer diameter of the screw shaft in the right angled and cross sectional shape of the screw groove, and besides, both of the face of the screw groove and the face of the outer diameter of the screw shaft are connected with the tangent line.

Next, in the above exemplified end cap type ball screw apparatus, the shape shown in FIG. 5 (the tube type ball screw apparatus) of the right angled and cross sectional shape of the screw groove of the screw shaft 3, that is, the distance is connected via the R-chamfering 40 between the face of the screw groove and the face of the outer diameter of the screw shaft, and the R-chamfer 40 is made a shape connected with the tangent line at the only side of the screw groove. With this shape, rotation was changed from low speed to high speed for carrying out the endurance test. The resulted one example is taken up.

The testing conditions are as follows.
Bearing number: NSK Ball Screw 40×40×1000-C5 (Ball diameter 7/32 inch)
Pre-load system: Oversize Pre-load
Circuit Number: 2.5 coils and 2 rows
Name of Tester: Ball Screw Endurance and Life Testing Machine made by NSK Ltd.
Pre-pressing load: 500 N
Testing load: Axial load=Non
Adjustable speed: 2 G
Rotation speed: 1000 $min^{-1}$, 2000 $min^{-1}$, 5000 $min^{-1}$
Stroke: 500 mm
Testing distance: 2000 km
Lubricating grease: Albania No. 2 (Showa Shell Oil)

Figure 7:
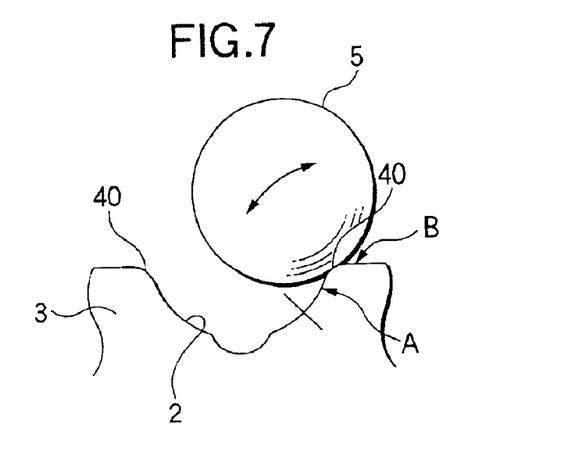
FIG. 7 is a view showing the ball forcing up from the screw groove toward the outer diameter-side of the screw shaft.
Figure 9:
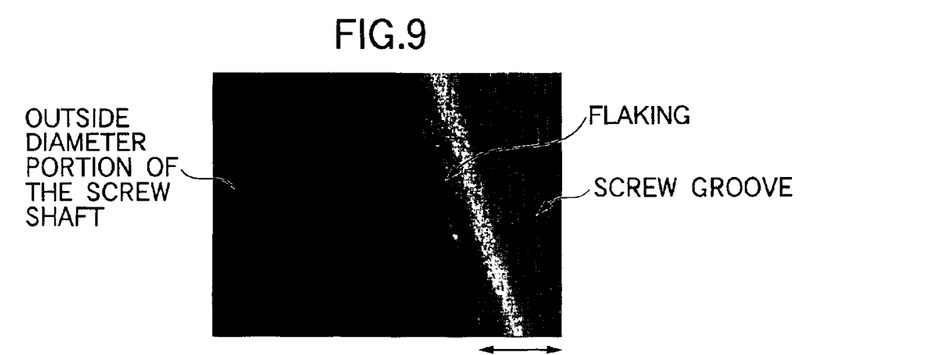
FIG. 9 is macro photography for explaining a flaking appeared at the vicinity of B-side of FIG. 5.

At the low speed of around 1000 $min^{-1}$, no flaking appeared at the screw shaft. Exceeding 2000 $min^{-1}$, the rate of flaking increased at several parts in the boundary between (the B-side of FIG. 5) the R-chamfered part of the screw groove of the screw shaft and the face of the outer diameter, and at the high speed of 5000 $min^{-1}$, the flaking appeared in almost all the area of the B-side. FIG. 9 shows a picture of a portion in which the flaking appeared. A cause of the flaking is assumed that when the ball (the steel ball) forces up in the screw groove while circulating, as shown in FIG. 7, it makes a point-contact with the edge of the outer diameter side of the screw shaft in the R-chamfered part 40, and owing to increasing of the surface pressure or occurring of slippage, the flaking will be accelerated.

From the above mentioned, it has been found that, in this test, the flaking occurred at the only B-side of the outer diameter side of the screw shaft where the R-chamfered part 40 is not connected with the tangent line, and no care is necessary about the A-side of the screw groove where the R-chamfered part 40 is connected with the tangent line. It is seen from this fact that, when employing the outer diameter-face of the screw shaft as the circulating path, the right angled and cross sectional shape of the screw groove is, as shown in FIG. 6, useful in such a grooved shape which connects, via the R-chamfer 30, the face of the screw groove 2 and the face of the outer diameter of the screw shaft 3, so that the R-chamfer contacts both faces.

The above mentioned content signifies that the right angled and cross sectional shape of the screw groove is made the same as that of the deflector type ball screw apparatus, however, in the case of the R-chamfer in the deflector type, if connecting via the tangent line, the face of the screw groove and the face of the outer diameter of the screw shaft, the R-dimension is reduced so that the ball circulates in a small R, and this embodiment is not always desirable in activity. If the R-dimension of the R-chamfer is increased, the portion of the screw groove receiving load is reduced, and when receiving the load, contacting ellipses of the ball and the screw groove interfere with the R-chamfered part, and the screw groove cannot cope with large load.

Figure 8C:
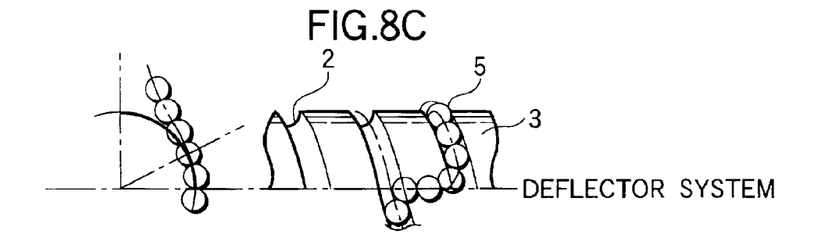

FIG. 8 shows the balls acting in the vicinity of the raking parts in the respective circulating systems of the tube system (FIG. 8A), the end cap system (FIG. 8B), and the deflector system (FIG. 8C). In the deflector system shown in FIG. 8C, for increasing the number of balls working in the loading area, the number of balls in the non-loading area must be decreased as possible, and the balls are rapidly raked, so that the balls are brought nearly to the condition where the ball are forces up in the right angled and cross sectional shape of the screw groove as shown in FIG. 7.

On the other hand, the end cap type of the present invention can arbitrarily determine the angle a for raking the ball from the screw groove (the angle $\alpha$ which is defined between the direction of the screw groove of the screw shaft and the direction where the ball forces up in the screw groove toward the outer diameter-side of the screw shaft, refer to FIG. 8B), and therefore by appropriately selecting the R-dimension of the R-chamfer 30 and the rake angle $\alpha$, the R-dimension of the R-chamfer 30 can be substantially (three dimensionally) increased, thereby enabling to provide compatibility both of the high speed and the loading resistance. That is, even if arbitrarily selecting the rake angle $\alpha$ and by only adjusting the phase of the ball circulating hole 8 of the nut body 6a-side, the circulation can be realized.

If this angle $\alpha$ is 45° or less with respect to the direction of the screw groove, even if the radius of curvature in the R-chamfered part 30 of the right angled and cross sectional shape of the screw groove is small as 15 to 45% of the radius of the ball 5, an apparent chamfer R for passing the ball 5 can be made enough large, so that the R-chamfered part 30 can be prevented from flaking. In addition, α is 5° or more, the ball can be forced up from the groove to the outer diameter at a degree of half circumference of the shaft outer circumference, so that the proposed raking can be realized.

As can be understood obviously from the foregoing description, according to the first aspect of the present invention, there can be provided an end cap which: is low in cost and simple in structure; can be flexibly adapted to various specifications of the shaft diameter and lead of a screw shaft; is properly enhanced in heat resistance, chemical resistance and strength against a light collision; and, can secure a proper operation performance and can reduce noises.

And, according to the second aspect of the present invention, in addition to the first aspect of the present invention, there is eliminated the need for consideration of the position matching of the end cap to the guide groove defined in the nut main body. This not only can facilitate the mounting operation of the end cap onto the end face of the nut main body but also makes it hard for the level difference to occur within the ball circulation passage to thereby restrict the ball passage noises, which can contribute to a reduction in noises. Also, since the ball is damaged less when it passes through the level difference portion, there is obtained an effect that the life of the ball can be prolonged.

According to the third aspect of the present invention, in addition to the first or second aspect of the present invention, the end face of the outside diameter portion of the screw shaft can be set large. Thanks to this, an oil seal for circulation of liquid for hollow cooling and a dust-proof seal can be used in such a manner that they are applied to the outside diameter surface of the screw shaft. At the same time, as the area on which the shoulder of a support bearing used in a ball screw shaft apparatus designed for a machine tool can be placed, there can be obtained a wide area, which allows the present structure to cope with an increase in the size of a bearing. Further, when compared with the conventional structure in which the ball is scooped up through the tongue, the ball circulation R portion can be made to have a large R, which not only can enhance the operation performance of the ball screw apparatus but also can contribute to a reduction in noises.

According to the fourth aspect of the present invention, in addition to any one of the first to third aspects of the present invention, the ball holding performance within the ball circulation R portion can be enhanced.

In the present inventions set forth in the aspects 5 to 7, in addition to the present invention of any one of the aspects 1 to 3, such an effect can be brought about which can heighten the durability (the loading resistance) at the high speed operation of the ball screw apparatus.

What is claimed is:

1. A ball screw apparatus comprising:
    a screw shaft including a spiral-shaped screw groove defined in an outer peripheral surface thereof;
    a ball nut loosely fittable with the screw shaft and including a screw groove defined in an inner peripheral surface thereof so as to correspond to the screw groove of the screw shaft, the ball nut comprising a nut main body forming a ball circulation hole penetrating through the nut main body in the axial direction thereof, and at least an end cap fixed to an end portion of the nut main body and forming a ball circulation R portion by collaborating with the end face of the nut main body, and the ball circulation R portion allowing the ball circulation hole and the screw groove to communicate with each other; and
    a large number of balls rollably interposed between both of the screw grooves, the ball circulation hole and the ball circulation R portion.
    wherein the nut main body defines a guide groove for the balls so that the guide groove is defined on the end face sides thereof and
    wherein the surface of the end cap opposed to the end face of the nut main body is defined substantially uniform in shape over the entire periphery thereof.

2. The ball screw apparatus as set forth in claim 1, wherein the end cap defines a hole through which the screw shaft is inserted, and the inside diameter of the hole is set smaller than a center circle diameter of the balls and larger than the outside diameter of the screw shaft.

3. The ball screw apparatus as set forth in claim 1, wherein the depth of the guide groove defined in the end face of the nut main body is set 40% or more of the diameter of the ball.

4. The ball screw apparatus as set forth in claim 1, wherein the screw groove of the screw shaft is defined arch-shaped, and both of a face of the screw groove and an outer face of the outer diameter of the screw shaft are connected via R-chamfering part in a right angled and cross sectional shape of the screw groove.

5. The ball screw apparatus as set forth in claim 4, wherein an angle is set of 5 to 45° which is defined between the direction following the screw groove of the screw shaft and the direction where the ball is forced up from the screw groove toward the outer diameter-side of the screw shaft.

6. The ball screw apparatus as set forth in claim 5, wherein a radius of curvature of the R-chamfered part is set of 15 to 45% of the radius of the ball.

7. The ball screw apparatus as set forth in claim 1, wherein the end cap does not include a guide groove disposed therein.

8. The ball screw apparatus as set forth in claim 1, wherein the end cap does not include a tongue disposed thereon.

* * * * *